United States Patent Office 3,224,310
Patented Dec. 21, 1965

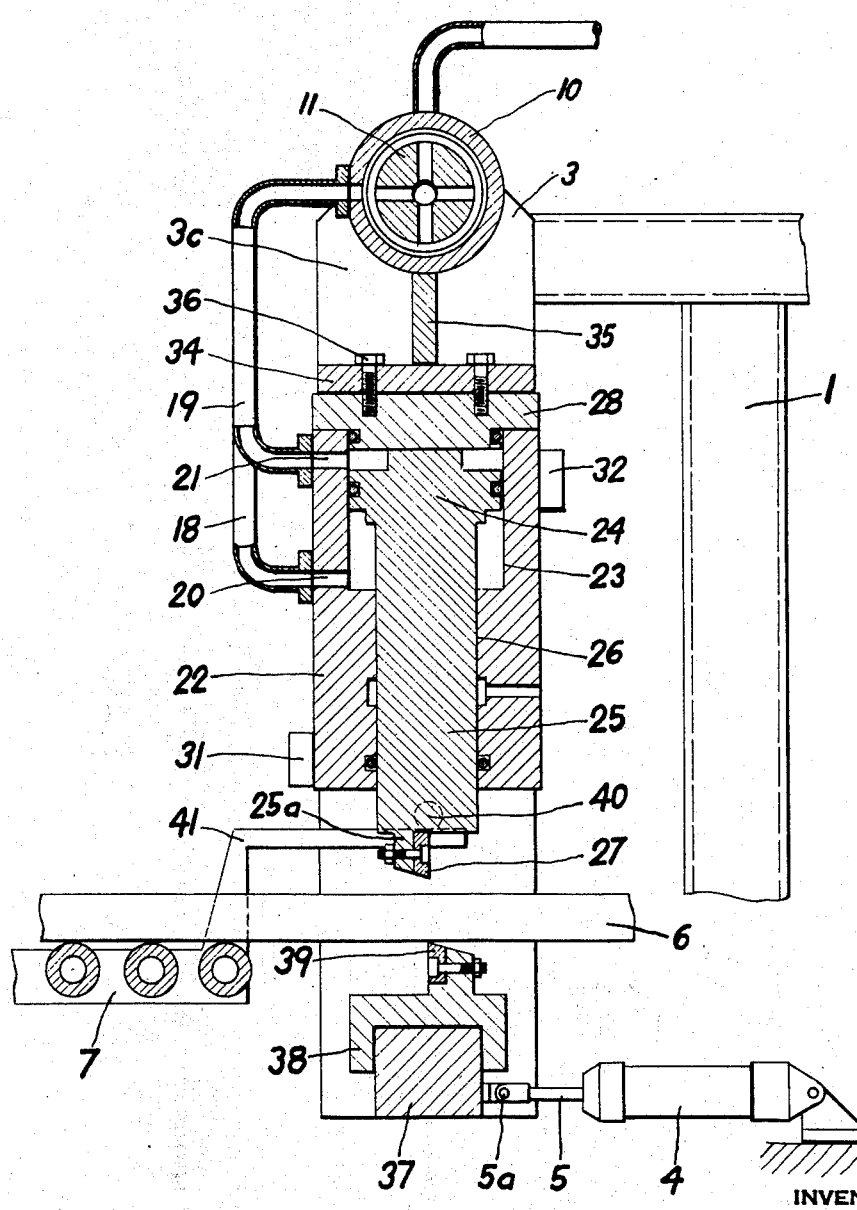

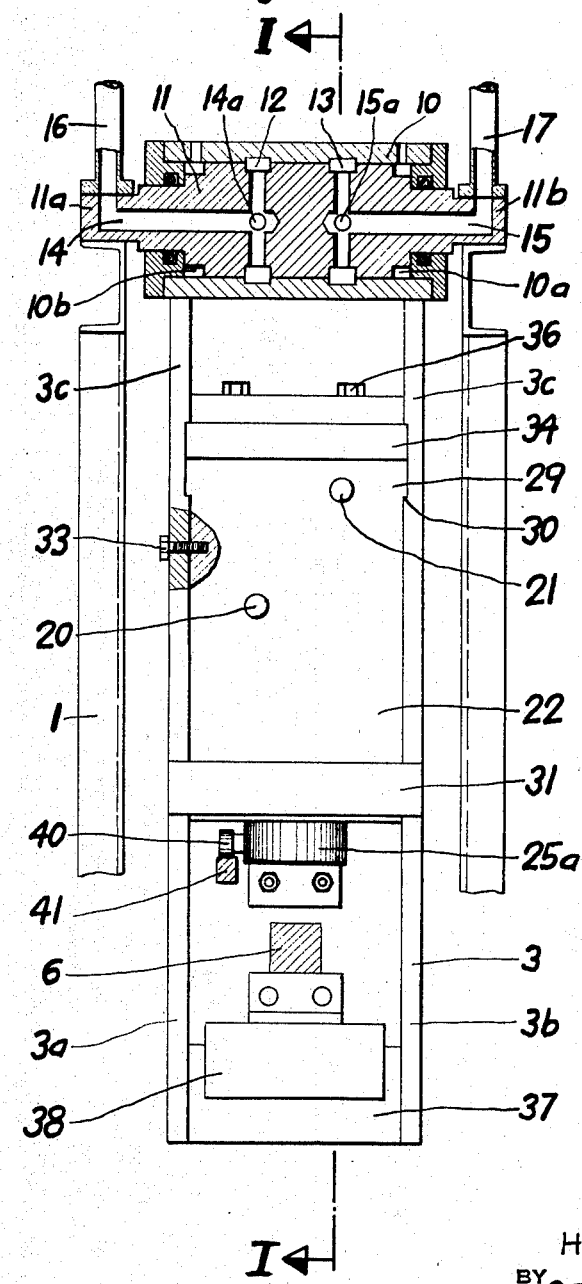

3,224,310
CUTTER FOR SEPARATING A STRAND
OF MATERIAL
Hans Bieri, Haberweidstrasse 36, Uster, Switzerland
Filed Feb. 4, 1963, Ser. No. 256,017
Claims priority, application Switzerland, Feb. 9, 1962,
1,606/62
12 Claims. (Cl. 83—157)

The present invention relates to an improved cutter for separating a strand of material, especially for cutting a metal strand or rod displaced during the time of cutting, this cutter being particularly adapted for a continuous casting plant or apparatus for the production of billets.

In the continuous casting of metals as well as with iron compositions or ferroalloys and also with nonferrous metals, a strand or rod is continuously produced which with a given, preferably quadratic or round cross-section, exhibits a length which is proportional to the charging weight. Since the likewise continuous, direct subsequent treatment, of the semifinished products produced with the continuous casting processes is still not extensively known and nowadays has not been realized at all, the strand, as was the case in the past, must be separated in sections of suitable length upon leaving the casting apparatus.

The process which has been most extensively employed for this purpose relies upon the use of oxyacetylene cutting torches. In view of the large quantities of gas necessary for each cutting operation this process has proven to be very expensive, completely apart from consideration of its limited reliability and safety in operation. Additionally, with each cutting operation there results a loss of material, which with increasing number of cutting operations in comparison with the charging weight can be of considerable importance.

In order to overcome the heretofore mentioned disadvantages appurtenant with gas cutting processes, it has already been proposed to utilize in lieu of the latter mechanical cutter which are manufactured in series and are obtainable on the market. However, it must be taken into consideration that the strand or rod which is to be separated is generally in a condition of continuous movement. The cutting element, whether such be gas cutting torches or knives, must then also during the entire duration of the cutting operation be able to follow the moving strand with the same speed.

With so-called mechanical pendulum cutters such requirement is fulfilled in that the knives during cutting swing or oscillate about a point of rotation disposed in the region of an eccentric crankshaft, and in this manner cover a limited distance. These cutters can be stationarily mounted. However, if one is concerned with cutters in which the knives are mounted in rigid guides, then the entire cutter during the cutting operation must follow along with the moving strand, and thereafter must again be returned into its starting position. The following displacement of a machine which in and of itself is already relatively heavy and massive then requires a considerably increased expenditure of control-, drive- and guide elements.

The utilization of any of the described, commercially available, standard cutters for separating moving strands during continuous casting is completely conceivable. However, in an actual or concrete instance one generally has preference for the mechanical pendulum cutters, since these have the accompanying advantage that they may be erected to be stationary. The limited practical value of such cutters in their application in conjunction with continuous casting plants resides, however, in the fact that they are very complicated, and especially that they exhibit a constructional width which is excessive with respect to the actual necessary working width.

In continuous casting plants or apparatus which simultaneously produce more than one strand, so-called multiple-strand installations, the individual strands for different and very important reasons lie as close to one another as is possible. The distance of the strands with respect to one another is generally maintained in the order of magnitude of one meter when these strands are disposed in a common plane. However, this means that it is practically impossible to erect the commercially available cutters which are very wide, even when the strands are arranged in staggered or echelon formation.

Thus, the present invention has as one of its primary objects to provide a cutter which permits overcoming the aforementioned disadvantages.

The cutter mechanism according to the present invention for separating a rod or strand of material, particularly for the cutting of billets or ingots from a metal strand moving during the moment of the cutting operation, wherein there is pivotably secured to a machine stand cutters which are movable with respect to one another as well as means provided with a frame for transmitting the cutter movement, is characterized in that the frame for each movable cutter supports a cylinder internally provided with a displaceable, preferably double-acting piston which is operatively connected with this movable cutter. With cutters in which both knives must be movable, it is also possible to provide a cylinder and piston for each of both knives, whereby both cylinders are connected to the frame.

Another important object of this invention is the provision of improved cutter means for cutting of a strand or strands during movement thereof, particularly adapted for use with continuous casting apparatus.

A further important object of the invention is to provide a cutter especially adapted for the production of billets from continuous cast strands or rods.

Still another object of the present invention is directed at providing a cutter mechanism readily adapted to cut strands or rods during their travel, is highly reliable and safe in operation, and is of such construction and arrangement that it requires relatively little space so that it can effectively operate in narrow quarters.

Yet a further object of the invention is the provision of improved cutter apparatus for severing a moving strand or rod of material during production, which cutter is relatively economical to manufacture, highly reliable in operation, easy to service and lubricate, and compact in structure.

It is another object of this invention to provide an improved cutter mechanism for separation of a rod of material, particularly for the cutting of billets from a rod of material moving during the cutting operation comprising relatively movable cutters as well as means including a frame for transmitting the cutter movement pivotably mounted to a machine stand, wherein the frame supports a cylinder provided with a piston for each movable cutter, preferably of the double-acting type, operatively connetced with the movable cutter of said relatively movable cutters.

These and still further objects and the entire scope of applicability of the present invention will become apparent from the detailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

In the drawings:

FIGURE 1 is a vertical sectional view taken through the improved cutter of the present invention, along the line I—I of FIGURE 2; and FIGURE 2 illustrates the cutter of FIGURE 1, partly in elevation and partly in cross-section.

Referring now to the drawings, it is to be recognized that reference numeral 1 represents a machine stand or column upright which supports a rotatably mounted pendulum or cradle frame 3, in a manner to be more fully described shortly, whereby said frame carries the knives 27, 39 of the cutter unit as well as the drive elements for the same. The cradle frame 3 comprises a pair of substantially parallelly arranged plate members 3a, 3b which are spaced a suitable distance from one another. A cylinder 4 is pivotably or hingedly connected at one end via a push or operating rod 5 and pivot pin 5a to the cradle frame 3, with said cylinder 4 in turn being hingedly connected at its other end via pivot pin 5b to the machine frame. Material transport means are disposed at the opposite side of the cradle frame 3 with respect to the cylinder 4, which in the desired embodiment illustrated comprises a roller bed 7 which can be either raised or lowered or is rockable about a horizontal axis. The roller bed 7 serves to transport the billets or ingots separated from a strand or rod 6.

The cradle frame 3 is provided at its upper end 3c with a journal box or hollow bushing 10 which is pushed onto a journal pin or pivot pin 11. The pivot pin 11 is rigidly connected at its opposed ends 11a, 11b with the column upright or stand 1, and is thereby not in a position to carry out rotational movement. Whereas the hollow bushing 10 is provided at its inner face with peripheral ring-shaped grooves 12 and 13, axial and radial channels or bores 14 and 15 are provided for the stationary pivot pin 11 which operatively communicate at both ends 11a and 11b of the pivot pin 11 with connecting members 16 and 17, respectively, and at their inner or confronting ends 14a and 15a merge with the peripheral or ring-shaped grooves 12 and 13, respectively. The connecting pieces 16 and 17 are operatively connected with a non-illustrated oil pump, for example an axial piston pump, via a reversing slide (not shown). On the other hand, there are operatively connected with both peripheral grooves 12 and 13 pipes or conduit members 18 and 19, respectively, which are in turn operatively connected with bores 20 and 21, respectively of a pressure cylinder 22. The bores 20 and 21 discharge at opposite ends of the cylinder 22 into a cylinder compartment or chamber 23 which slidably contains a working piston 24. The piston 24 possesses a ram member 25 which extends in piercing relation through a guide bore 26 of the cylinder 22, with the ram member 25 carrying the movable cutting knife 27 at its free or lower end 25a.

By referring to FIGURE 2 it will be seen that the cylinder 22 is provided at its upper end which is obturated by a cover member 28, with two flanges 29 by means of which the cylinder 22 is supported on cooperating shoulders 30 of the cradle frame 3. The cylinder 22 is rigidly connected with the cradle frame 3 via a respective stirrup or bracket 31 and 32 secured at opposed sides of the cylinder 22 at its lower and upper end, in a manner shown in FIGURE 1, in order to take up the pitching moment resulting from the cutter movement. Additionally, the cradle frame 3 is laterally connected via one or more screws 33 or like expedients with the cylinder 22, in order to secure such against displacement on the shoulders 30. The cover member 28 is not connected with the cylinder 22 with which it engages, rather, such bears against a plate member 34 welded to the cradle frame 3 which takes up forces transmitted to the cover member 28. The plate member 34 in turn bears against a rib 35 welded to the cradle frame 3 or with the bushing 10. The screws 36 which connect the cover member 28 with the plate member 34 only serve for security purposes.

At the lower end of the cradle frame 3 a knife support or holder 38 is connected to a transverse or crossbeam 37 which carries the second cutting knife 39 which in the illustrated embodiment is stationary relative to cutting knife 27. The cylinder 4 which is operatively connected with the cradle frame 3 via the crossbeam 37 and the piston rod 5, in the illustrated embodiment, has the function to support or supplement the forced pendulum or swinging movement of the cradle frame 3 occurring when the cutting knives 27 and 37 act under the influence of the continuously moving or advancing strand 6. By way of example, the cradle frame 3 can already be brought into movement shortly before the cutting knives 27, 39 act upon the strand or rod 6, so that the cradle frame 3 upon starting of the cutting operation itself moves with the same speed as the strand or rod 6. In this manner impacts against the strand or rod 6 can almost be completely prevented. At the end of the cutting operation, that is, when the movable cutting knife 27 is retracted by the piston member 24 the cradle frame 3 can be braked by means of the cylinder 4 actuated pneumatically for example, and eventually after corresponding reversal of the corresponding reversal of the compressed-air supply can be returned with a predetermined speed back into its starting position.

In the case of a vertical continuous casting apparatus in which the cutter is arranged in a lying or horizontal position, a force must be applied via the cylinder 4 which corresponds to the weight of the movable cradle frame 3, or which is larger than this weight, in order to carry out a return movement thereof back into the starting position. Of course, the piston member arranged in the cylinder 4 can also be hydraulically driven.

As can best be seen by inspecting FIGURE 2, the end 25a of the ram member 25 which extends externally of the cylinder 22 carries a roller member 40 against which abuts a rail member 41 secured to the roller bed 7. During the lowering movement of the ram 25 there is directly transmitted to the roller bed 7 a pivoting movement or a lowering movement via the roller 40 and rail 41 on which said roller slides, which movement corresponds to the movement of the strand section to be sheared. Upon withdrawal of the ram 25 the associated end of the roller bed 7 automatically moves, due to a restoring force (for example, spring means, compressed air or hydraulic cylinder arrangement), in an upward direction back into the starting position.

The described support of the cradle frame 3 through the agency of a bushing 10 and a pivot pin or journal 11 which contain passages for the working medium, that is oil for example, has the advantage that the support arrangement is also lubricated by this oil. It will be seen from FIGURE 2 that both of the ring-shaped grooves 12 and 13 are arranged in the vicinity of the central region of the bushing 10, whereas at the outer ends of the bushing 10 there are formed leakage-oil grooves or rings 10a and 10b which collect the oil moving between the bushing 10 and the journal 11 and conduct such to a suitable overflow oil line or conduit (not shown). Thus, the parts which are movable relative to one another must not be sealed against the working pressure (high-pressure) of the oil, but rather, must only be sealed against the relatively low pressure of the leakage-oil which flows through the overflow conduit.

Insofar as the pendulum cutter is employed for cutting strands of material of relatively small cross-section or material of less rigidity, it is naturally also conceivable to actuate the piston 24 by means of a pneumatic pressure medium. Moreover, as previously explained, if desired the cutter knife 39 could also be driven by a cylinder and piston arrangement supported by the cradle frame 3 of construction substantially similar to the cylinder 22 and piston 24 arrangement described herein. If a number of strands are to be simultaneously cut then a corresponding number of cutter units would be provided.

While there is shown and described a present preferred embodiment of the invention it is to be distinctly understood that the invention is not limited thereto but may be otherwise variously embodied and practised within the scope of the following claims.

Having thus described the present invention, what is desired to be secured by United States Letters Patent, is:

1. A cutter for separating a strand of material, especially adapted for cutting finite sections from a metal stand moving during the time of the cutting operation; comprising a machine stand, cutter means including cutter elements mounted for relative movement, at least one of said cutter elements being movable, a frame pivotally connected to said machine stand for transmission of the movement of said cutter elements, a cylinder and a piston displaceably mounted in said cylinder supported by said frame and operatively connected with said movable cutter element of said relatively movable cutter means to drive the associated movable cutter element, support means for pivotably connecting said frame to said machine stand, said support means including a pivot pin rigidly connected at opposed ends with said machine stand and a hollow bushing through which piercingly extends said pivot pin for pivotably supporting said frame, said bushing and said pivot pin being provided with interfacial peripheral channel means defining flow ducts for transfer of a working medium through said support means to said cylinder.

2. A cutter according to claim 1, wherein said piston is constructed and arranged in said cylinder to work as a double acting piston.

3. A cutter according to claim 1, wherein said cylinder includes a cylinder chamber in which said piston is displaceably mounted, said cylinder having inlet means through which said working medium is admitted to drive said piston, a cover member arranged at one end of said cylinder to seal said cylinder chamber, said cover member being operatively connected with said frame to transmit forces applied to said cylinder and said cover member during the cutting operation directly to said frame.

4. A cutter according to claim 1, including a pressure cylinder associated with said frame for assisting and controlling its movement.

5. A cutter for separating a strand of material, especially adapted for cutting finite sections from a metal strand moving during the time of the cutting operation; comprising a machine stand, cutter means including cutter elements mounted for relative movement, at least one of said cutter elements being movable, a frame pivotally connected to said machine stand for transmission of the movement of said cutter elements, a cylinder and a piston displaceably mounted in said cylinder supported by said frame and operatively connected with said movable cutter element of said relatively movable cutter means to drive the associated movable cutter element, support means for pivotably connecting said frame to said machine stand, said support means including a pivot pin rigidly connected at opposed ends with said machine stand and a hollow bushing through which piercingly extends said pivot pin for pivotably supporting said frame, said bushing and said pivot pin being provided with channel means defining flow ducts for transfer of a working medium through said support means to said cylinder, said channel means of said bushing comprising a pair of peripheral ring-shaped grooves arranged in the central region of said bushing, said channel means of said pivot pin comprising bore means communicating with said ring-shaped grooves.

6. A cutter according to claim 5, wherein said bushing is provided with a leakage groove disposed at each side of said ring-shaped grooves in the direction of the opposite ends of said pivot pin, said working medium being oil, said oil moving between said bushing and said pivot pin for lubrication thereof and being collected by said leakage-grooves.

7. A cutter for separating a strand of material, especially adapted for cutting finite sections from a metal strand moving during the time of the cutting operation; comprising a machine stand, cutter means including cutter elements mounted for relative movement, at least one of said cutter elements being movable, a frame pivotably connected to said machine stand for transmission of the movement of said cutter elements, a cylinder and a piston displaceably mounted in said cylinder supported by said frame and operatively connected with said movable cutter element of said relatively movable cutter means to drive the associated movable cutter element, support means for pivotably connecting said frame to said machine stand, said support means including a pivot pin rigidly connected to said machine stand and a hollow bushing internally housing said pivot pin for pivotably supporting said frame, said hollow bushing and said pivot pin being provided with channel means defining flow ducts for transfer of a working medium having lubricating properties through said support means to said cylinder, said channel means of said hollow bushing comprising spaced, peripheral ring-shaped grooves disposed at the inner wall of said hollow bushing and approximately in the vicinity of the central region of said hollow bushing, said channel means of said pivot pin comprising respective bore means communicating with a respective ring-shaped groove for delivering to the latter said working medium having lubricating properties, respective leakage-groove means disposed to each side of said ring-shaped grooves in a direction towards the associated end of said hollow bushing for collecting working medium seeping in lubricating fashion between confronting surfaces of said hollow bushing and said pivot pin, said working medium moving into said leakage-groove means at considerably lower pressure than when in said ring-shaped grooves, whereby said hollow bushing and said pivot pin need only be sealed against the relatively low pressure of the working medium collected in said leakage-groove means.

8. A cutter for separating a strand of material, especially adapted for cutting billets from a metal strand moving during the time of the cutting operation; comprising a machine stand, cutter means including cutter elements mounted for relative movement, at least one of said cutter elements being movable, a frame pivotably connected to said machine stand for transmission of the movement of said cutter elements, a cylinder and a piston displaceably mounted in said cylinder supported by said frame and operatively connected with said movable cutter element of said relatively movable cutter means to drive the associated movable cutter element, said piston being constructed and arranged in said cylinder to operate as a double-acting piston, support means for pivotably connecting said frame to said machine stand, said support means including a pivot pin rigidly connected to said machine stand and a bushing cooperating with said pivot pin for pivotably supporting said frame, said bushing and said pivot pin being provided with channel means defining flow ducts for transfer of a working medium through said support means to said cylinder, said piston being provided with a ram, transport means for removing the cut billets, means cooperating with said ram and said transport means for adjusting the position of said transport means in accordance with the movement of said frame and said cutter means.

9. A cutter according to claim 8, wherein said transport means comprises a roller bed.

10. In a cutter having a pair of cutter elements mounted for relative movement with at least one of said cutter elements being movable, a cradle frame comprising a pair of spaced plate members, a cylinder for at least said movable cutter element supported by said cradle frame, a piston mounted for reciprocal movement in said cylinder in driving connection with said movable cutter element, said pair of cutter elements being operably supported by said cradle frame, support means for rockably supporting said cradle frame, said support means comprising a hollow bushing operatively connected to said cradle frame and a stationary pivot pin piercingly extending through said hollow bushing about which said bushing rocks, said hollow bushing having a pair of spaced peripheral ring-shaped grooves located approximately in the vicinity of the central region of said bushing, said stationary pivot pin having respective bore means communicating with a respective ring-shaped groove for delivering a working medium having lubricating properties to said ring-shaped grooves, respective leakage-groove means disposed to each side of said ring-shaped grooves in a direction towards the associated end of said hollow bushing for collecting working medium seeping from said ring-shaped grooves between said hollow bushing and said pivot pin extending through said hollow bushing, whereby said working medium lubricates contacting surfaces of said hollow bushing and said pivot pin, and drive means for assisting movement of said cradle frame.

11. In a cutter having a pair of cutter elements mounted for relative movement with at least one of said cutter elements being movable, a cradle frame comprising a pair of spaced plate members, a cylinder for at least said movable cutter element supported by said cradle frame, a piston mounted for reciprocal movement in said cylinder in driving connection with said movable cutter element, said pair of cutter elements being operably supported by said cradle frame, a cover member obturating one end of said cylinder, said cover member being connected to said cradle frame so that forces applied during the cutting operation are directly applied to said cradle frame, support means for rockably supporting said cradle frame, said support means comprising a hollow bushing operatively connected to said cradle frame and a stationary pivot pin piercingly extending through said hollow bushing about which said bushing rocks, said hollow bushing having a pair of spaced peripheral ring-shaped grooves located approximately in the vicinity of the central region of said bushing, said stationary pivot pin having respective bore means communicating with a respective ring-shaped groove for delivering a working medium having lubricating properties to said ring-shaped grooves, respective leakage-groove means disposed to each side of said ring-shaped grooves in a direction towards the associated end of said hollow bushing for collecting working medium seeping from said ring-shaped grooves between said hollow bushing and said pivot pin extending through said hollow bushing, whereby said working medium lubricates contacting surfaces of said hollow bushing and said pivot pin, and drive means for controlling movement of said cradle frame.

12. In a cutter having a pair of cutter elements mounted for relative movement with at least one of said cutter elements being movable, a cradle frame comprising a pair of spaced plate members, a cylinder for at least said one movable cutter element supported by said cradle frame, a piston mounted for reciprocal movement in said cylinder in driving connection with said movable cutter element, said pair of cutter elements being operably supported by said cradle frame, support means for rockably supporting said cradle frame, said support means comprising a hollow bushing operatively connected to said cradle frame and a stationary pivot pin piercingly extending through said hollow bushing about which said bushing rocks, means for transmitting a working medium through said support means to opposite faces of said piston in said cylinder, said transmitting means comprising a pair of ring-shaped grooves provided for said bushing, an individual flow channel extending through said pivot pin communicating with a respective ring-shaped groove, conduit means operatively communicating a respective ring-shaped groove with a respective face of said piston, and drive means for controlling movement of said cradle frame.

References Cited by the Examiner
UNITED STATES PATENTS

| | | | |
|---|---|---|---|
| 587,362 | 8/1897 | Edwards | 83—316 X |
| 1,323,717 | 12/1919 | Nielsen | 83—308 X |
| 1,782,362 | 11/1930 | McAruthur | 83—639 X |
| 1,803,580 | 5/1931 | Williams | 83—308 |
| 2,415,325 | 2/1947 | Wood | 83—316 |
| 2,436,572 | 2/1948 | Henschker | 83—315 X |
| 2,829,713 | 4/1958 | Nilsson | 83—316 X |

WILLIAM W. DYER, JR., *Primary Examiner.*

ANDREW R. JUHASZ, *Examiner.*